(12) United States Patent
Powers, III

(10) Patent No.: US 9,476,203 B2
(45) Date of Patent: Oct. 25, 2016

(54) COLUMN/BEAM MAUFACTURING APPARATUS AND METHODS

(71) Applicant: John Powers, III, Phoenix, AZ (US)

(72) Inventor: John Powers, III, Phoenix, AZ (US)

(*) Notice: Subject to any disclaimer, the term of this patent is extended or adjusted under 35 U.S.C. 154(b) by 0 days.

(21) Appl. No.: 14/641,125

(22) Filed: Mar. 6, 2015

(65) Prior Publication Data
US 2016/0258159 A1 Sep. 8, 2016

(51) Int. Cl.
| | | |
|---|---|---|
| *B23K 37/00* | (2006.01) |
| *E04C 3/32* | (2006.01) |
| *B21D 51/10* | (2006.01) |
| *B21D 17/04* | (2006.01) |
| *B23K 33/00* | (2006.01) |

(52) U.S. Cl.
CPC ........... *E04C 3/32* (2013.01); *B21D 17/04* (2013.01); *B21D 51/10* (2013.01); *B23K 33/002* (2013.01)

(58) Field of Classification Search
None
See application file for complete search history.

(56) References Cited

U.S. PATENT DOCUMENTS

| | | | | |
|---|---|---|---|---|
| 2,009,685 A * | 7/1935 | Caputo | ............... | B23K 11/062 219/61.5 |
| 2,340,003 A * | 1/1944 | McDermott | ............. | E04C 3/32 52/843 |
| 2,502,012 A * | 3/1950 | Kinkead | ................. | B21C 37/08 219/61.11 |
| 2,647,981 A * | 8/1953 | Wogerbauer | ...... | B23K 11/0873 219/59.1 |
| 2,950,376 A * | 8/1960 | Wogerbauer | ....... | B21C 37/0803 219/61.11 |
| 2,967,594 A * | 1/1961 | Deam | .................. | E04B 1/2403 403/173 |
| 3,132,234 A * | 5/1964 | Wogerbauer | ....... | B21C 37/0803 219/61.3 |
| 3,263,053 A * | 7/1966 | Rudd | ................... | B23K 13/046 219/60 A |
| 3,559,278 A * | 2/1971 | Brandberg et al. | .... | B21D 51/00 228/151 |
| 3,603,761 A * | 9/1971 | Wogerbauer | ....... | B21C 37/0803 219/102 |
| 3,707,257 A * | 12/1972 | Wogerbauer | ........... | B21C 37/08 228/162 |
| 3,989,396 A * | 11/1976 | Matsumoto | .......... | E04B 1/2403 29/463 |
| 4,099,662 A * | 7/1978 | Nakajima | .......... | B21C 37/0803 228/151 |

(Continued)

FOREIGN PATENT DOCUMENTS

| | | | | |
|---|---|---|---|---|
| GB | 1088995 A | * | 10/1967 | ............... E04B 1/24 |
| JP | 55103295 A | * | 8/1980 | |

(Continued)

*Primary Examiner* — Kiley Stoner
(74) *Attorney, Agent, or Firm* — Robert A. Parsons; Michael W. Goltry; Parsons & Goltry

(57) ABSTRACT

Column/beam forming apparatus including an initial channel-forming station forming received strips of sheet metal alternately into intermediate upwardly and intermediate downwardly opening channel. A final channel-forming station positioned to receive intermediate upwardly and intermediate downwardly opening channels and complete bending the received intermediate channels into upwardly opening and downwardly opening C-shaped channels. Each downwardly opening C-shaped channel being positioned in an aligned overlying relationship to a mating upwardly opening C-shaped channel upon exiting the final channel-forming station. A channel-welding station positioned to weld the upwardly opening C-shaped channel and downwardly opening C-shaped channel in the aligned overlying position along an interface between adjacent surfaces of the upwardly opening C-shaped channel and downwardly opening C-shaped channel.

13 Claims, 14 Drawing Sheets

(56) References Cited

U.S. PATENT DOCUMENTS

| | | | | |
|---|---|---|---|---|
| 4,301,348 A | * | 11/1981 | Nakazima | B21C 37/0803 219/59.1 |
| 4,310,740 A | * | 1/1982 | Nakazima | B21C 37/0815 219/59.1 |
| 4,563,802 A | * | 1/1986 | Benteler | B21D 53/88 228/147 |
| 4,964,256 A | * | 10/1990 | McCracken | B21D 47/01 29/897.34 |
| 5,464,302 A | * | 11/1995 | Menchetti | E04C 3/005 403/335 |
| 5,609,289 A | * | 3/1997 | Boccanfuso | A44C 11/002 228/173.6 |
| 6,494,360 B1 | * | 12/2002 | Flehmig | B21C 37/0815 228/17.5 |
| 6,688,000 B2 | * | 2/2004 | Wang | B23K 33/006 228/135 |
| 7,670,099 B2 | * | 3/2010 | Nakajima | E02F 3/38 228/155 |
| 8,240,054 B2 | * | 8/2012 | Peterson | B23K 26/38 29/407.09 |
| 8,872,060 B2 | * | 10/2014 | Johnson | B21D 5/086 219/121.63 |
| 8,987,627 B2 | * | 3/2015 | Berube | B21C 37/08 219/59.1 |
| 2001/0004825 A1 | * | 6/2001 | Menendez | E04C 3/07 52/846 |
| 2002/0005397 A1 | * | 1/2002 | Bong | B23K 9/0203 219/125.1 |
| 2004/0139684 A1 | * | 7/2004 | Menendez | E04C 3/07 52/831 |
| 2008/0022625 A1 | * | 1/2008 | Miller | B23K 11/02 52/633 |
| 2011/0308660 A1 | * | 12/2011 | Berube | B21C 37/08 138/171 |
| 2014/0083046 A1 | * | 3/2014 | Yang | E04B 1/24 52/704 |
| 2015/0104244 A1 | * | 4/2015 | Watanabe | B23K 26/244 403/271 |
| 2015/0202721 A1 | * | 7/2015 | Gu | B23K 11/04 219/100 |
| 2015/0209909 A1 | * | 7/2015 | Shimada | B23K 26/3206 403/271 |
| 2015/0315787 A1 | * | 11/2015 | Swenters | E04C 3/08 52/633 |

FOREIGN PATENT DOCUMENTS

| | | | | |
|---|---|---|---|---|
| JP | 57014480 | A | * | 1/1982 |
| JP | 60231581 | A | * | 11/1985 |
| JP | 02020622 | A | * | 1/1990 |
| JP | 03216278 | A | * | 9/1991 |
| JP | 03248788 | A | * | 11/1991 |
| JP | 04251612 | A | * | 9/1992 |
| JP | 05131285 | A | * | 5/1993 |

* cited by examiner

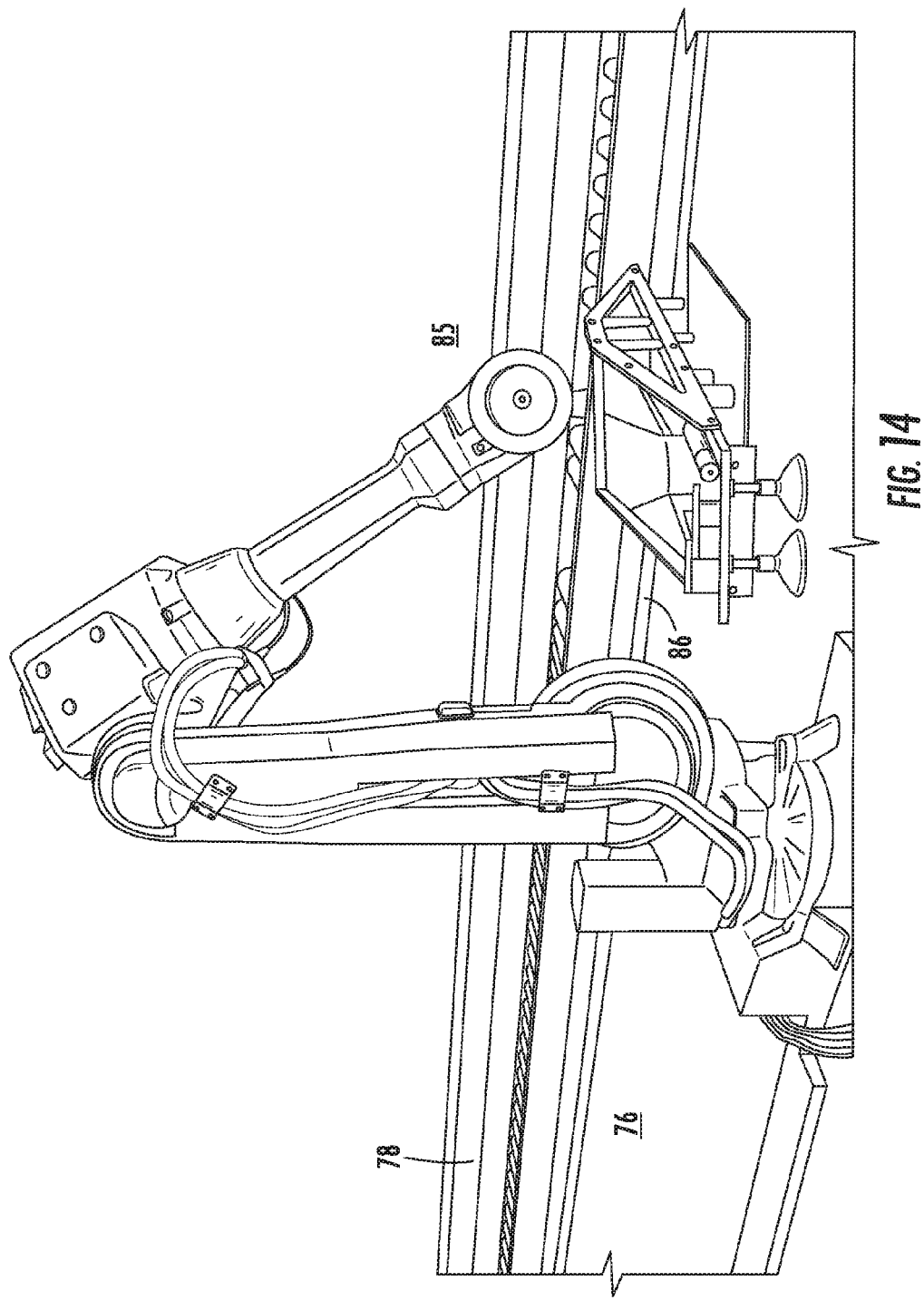

US 9,476,203 B2

COLUMN/BEAM MAUFACTURING APPARATUS AND METHODS

FIELD OF THE INVENTION

This invention generally relates to apparatus and methods for manufacturing columns and beams for use in and support of flat roof structures and the like.

BACKGROUND OF THE INVENTION

At the present time, metal flat roof structures are popular for solar panel and/or roof section mounts as well as protection from the elements. The flat roof structures generally include horizontal beams or rafters attached to the upper ends of vertical columns having lower ends fixed in the ground or other mounting structures. Both the columns and beams are preferably fabricated from two sheet metal channels, each having inwardly directed flanges formed integral with the ends of the opposed legs. Typical examples of such structures are presented in a copending United States Patent Application entitled "Flat Roof Support Structure", filed 3 May 2012, bearing Ser. No. 13/462,919, and incorporated herein by reference.

It is an object of the present invention to provide new and improved manufacturing apparatus and methods for supporting columns and beams in roof structures and the like.

It is another object of the present invention to provide new and improved manufacturing apparatus and methods for columns and beams in roof structures that include less labor and cost.

SUMMARY OF THE INVENTION

Briefly, to achieve the desired objects of the instant invention in accordance with a preferred embodiment thereof, column/beam forming apparatus is disclosed that forms two C-shaped channels into a single column/beam. The apparatus includes a continuous source of sheet metal strips, each strip being of a desired column/beam length. An initial channel-forming station is positioned to receive the strips of sheet metal from the continuous source and is designed to provide initial longitudinal bending operations on each strip. The initial bending operations alternately bend received strips into intermediate upwardly opening channels and intermediate downwardly opening channels. A final channel-forming station is positioned to receive intermediate upwardly opening channels and intermediate downwardly opening channels from the initial channel-forming station and complete bending the intermediate upwardly opening channels and intermediate downwardly opening channels into upwardly opening C-shaped channels and downwardly opening C-shaped channels. Each downwardly opening C-shaped channel is positioned in an aligned overlying relationship to a mating upwardly opening C-shaped channel upon exiting the final channel-forming station and a channel-welding station is positioned to weld the upwardly opening C-shaped channel and downwardly opening C-shaped channel in the aligned overlying position along an interface between adjacent surfaces of the upwardly opening C-shaped channel and downwardly opening C-shaped channel.

The desired objects of the instant invention are further achieved in accordance with a method of forming two C-shaped channels into a single column/beam. The method includes a step of providing a continuous source of sheet metal strips, each strip being of a desired column/beam length. The method further includes a step of receiving strips of sheet metal of the desired column/beam length from the continuous source and, using a single intermediate bending apparatus, continuously forming alternate received strips into intermediate upwardly opening channels and intermediate downwardly opening channels, respectively. The method further includes a step of receiving the intermediate upwardly opening channels and intermediate downwardly opening channels and, using a single final bending apparatus, performing a complete or final bending operation. The complete bending operation continuously forming the intermediate upwardly opening channels into upwardly opening C-shaped channels and the intermediate downwardly opening channels into downwardly opening C-shaped channels. Each downwardly opening C-shaped channel is positioned in an aligned overlying relationship to a mating upwardly opening C-shaped channel upon exiting from the single final bending apparatus and each aligned upwardly opening C-shaped channel and downwardly opening C-shaped channel is welded in the aligned overlying position along an interface between adjacent surfaces of the upwardly opening C-shaped channel and downwardly opening C-shaped channel.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which:

FIG. 14 is an isometric side view of a channel-welding station positioned to receive the aligned first and second channels from the channel-aligning station illustrated in FIG. 12.

DETAILED DESCRIPTION OF A PREFERRED EMBODIMENT

Generally, flat roof structures include a plurality of vertical columns or posts each with a beam attached to an upper end. Both the columns and beams are preferably fabricated from two opposed sheet metal C-shaped channels. Each channel includes a flat major wall, two side walls extending perpendicular to the major wall from opposite edges and a flange extending inwardly from each side wall toward each other perpendicular to the side walls. Columns/beams of this type have several major advantages: they can be fabricated from relatively inexpensive sheet metal and are relatively strong for the weight.

Prior art apparatus used to form channels of the type described above is disclosed in a United States Patent Publication 2003/0000271, entitled "Rollforming Machine and Methods", published 2 Jan. 2003. FIGS. 3A and 3B illustrate what the Publication refers to as "component C" or a stud for use in constructing buildings and the like.

Referring to the present invention, the various figures illustrate apparatus for manufacturing columns/beams of the type described above in the copending application. As will become apparent to one of ordinary skill in the art from the following disclosure, the columns/beams are manufactured in a single continuous operation that greatly reduces the time, labor, and therefore the cost of the columns/beams.

Figure 1:
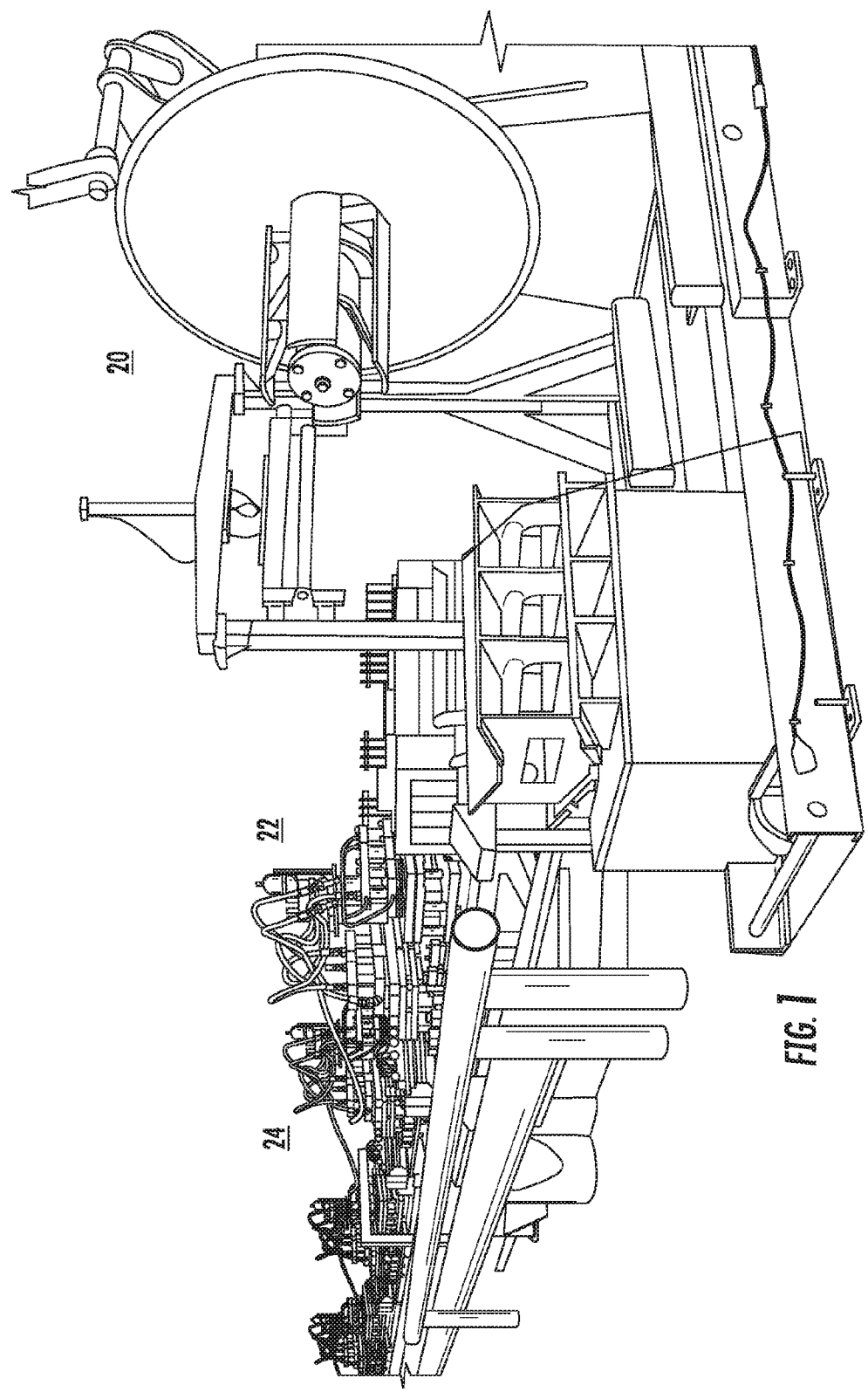
FIG. 1 is an isometric side view of the beginning/input end of column/beam manufacturing apparatus, in accordance with the present invention, illustrating a sheet metal supply station and initial channel forming station.
Figure 2:
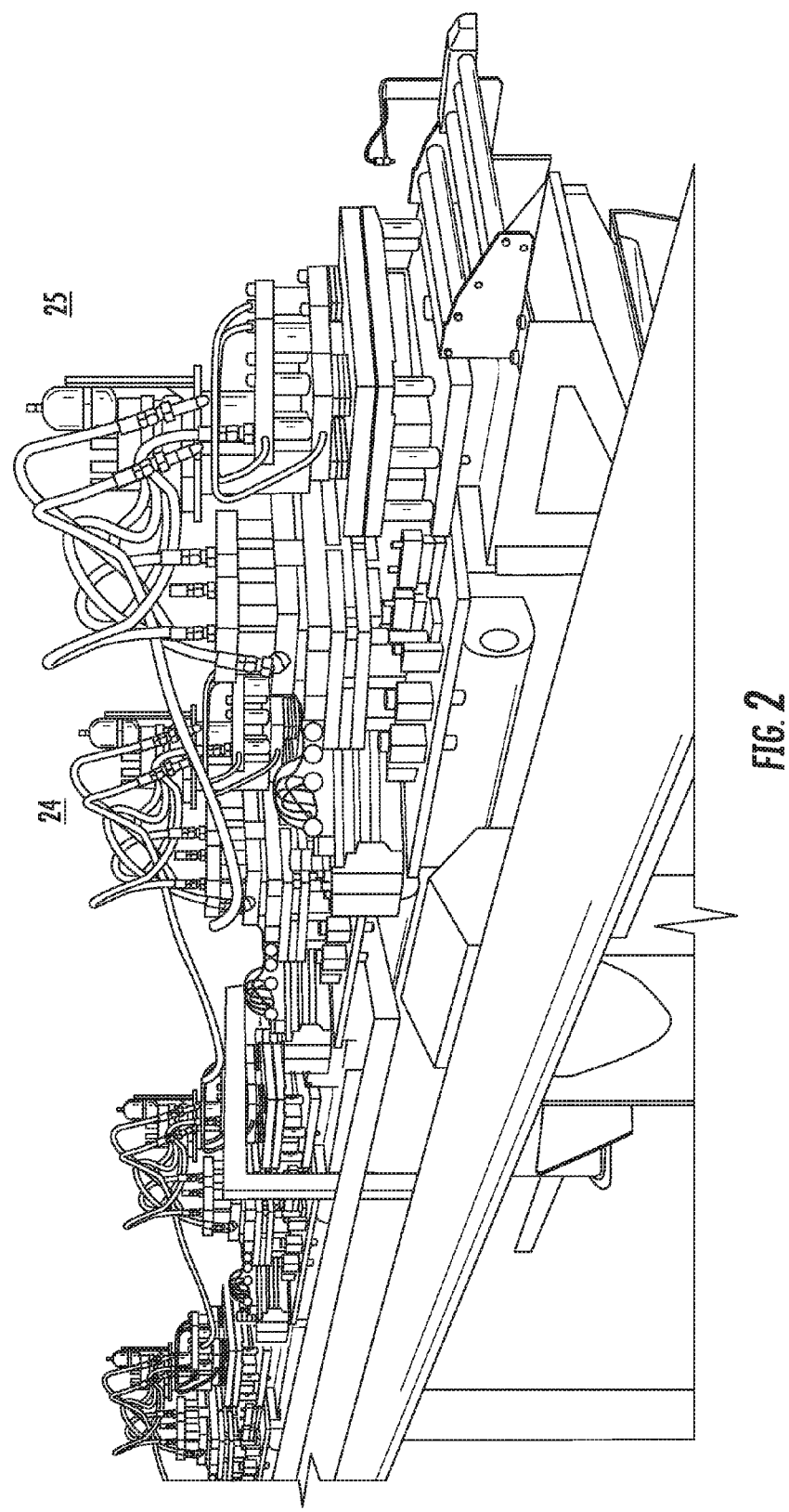
FIG. 2 is an isometric side view of the column/beam manufacturing apparatus of FIG. 1, illustrating an enlarged view of the initial channel-forming station.

Turning to FIG. 1, a roller 20 is illustrated that is designed to carry a roll of sheet metal. It should be understood that the roll of sheet metal will have a width that allows strips of the sheet metal to be formed into the desired channels. A continuous strip of sheet metal from roller 20 extends through the various guides illustrated and is cut to a desired length in a cutting machine 22. The cut strips of sheet metal continue into an initial channel-forming station 24. An enlarged view of initial channel-forming station 24 is illustrated in FIG. 2. Initial channel-forming station 24 performs some initial or intermediate longitudinal bends in each strip of sheet metal that determines whether the channel being formed will open upwardly or downwardly. The terms "upwardly" and downwardly" are included herein only for description relative to the drawings and do not indicate a direction. To accomplish this task, initial channel-forming station 24 includes a plurality of sets of double-surface forming-rollers, examples of which are illustrated in FIGS. 3-6. Each set of the plurality of sets is positioned in a spaced relationship from a previous set to gradually bend a strip of sheet metal into the desired form. It should be specifically noted that each of the double-surface forming-rollers has a double forming-surface and the double-surface forming-rollers are movably positioned in channel-forming station 24 to simultaneously move to either a first position in which one of the double forming-surfaces will start or form the strip of sheet metal in an intermediate upwardly opening direction and a second position in which the other of the double forming-surfaces will start or form the strip of sheet metal in an intermediate downwardly opening direction. Movement of the double-surface forming-rollers is accomplished in this preferred apparatus by pneumatic hoses and cylinders designated in FIG. 2 by the number 25. While pneumatic apparatus are illustrated in this example, it will be understood that other apparatus, hydraulic, mechanical, etc. can be used.

Figure 3:
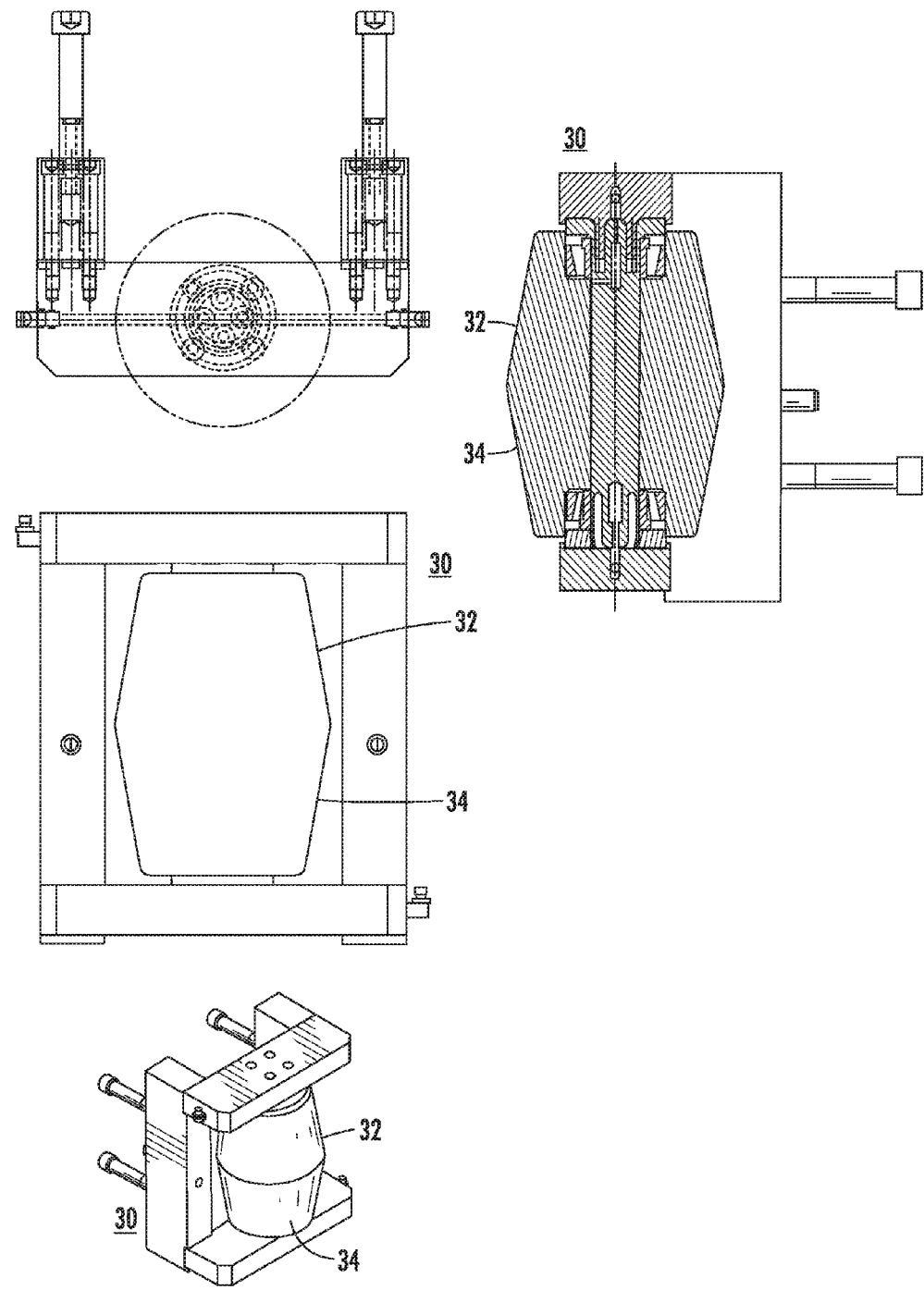
FIGS. 3-6 are isometric/side views of several channel-forming multi-surface elements used in the initial channel-forming station of FIG. 2.
Figure 4:
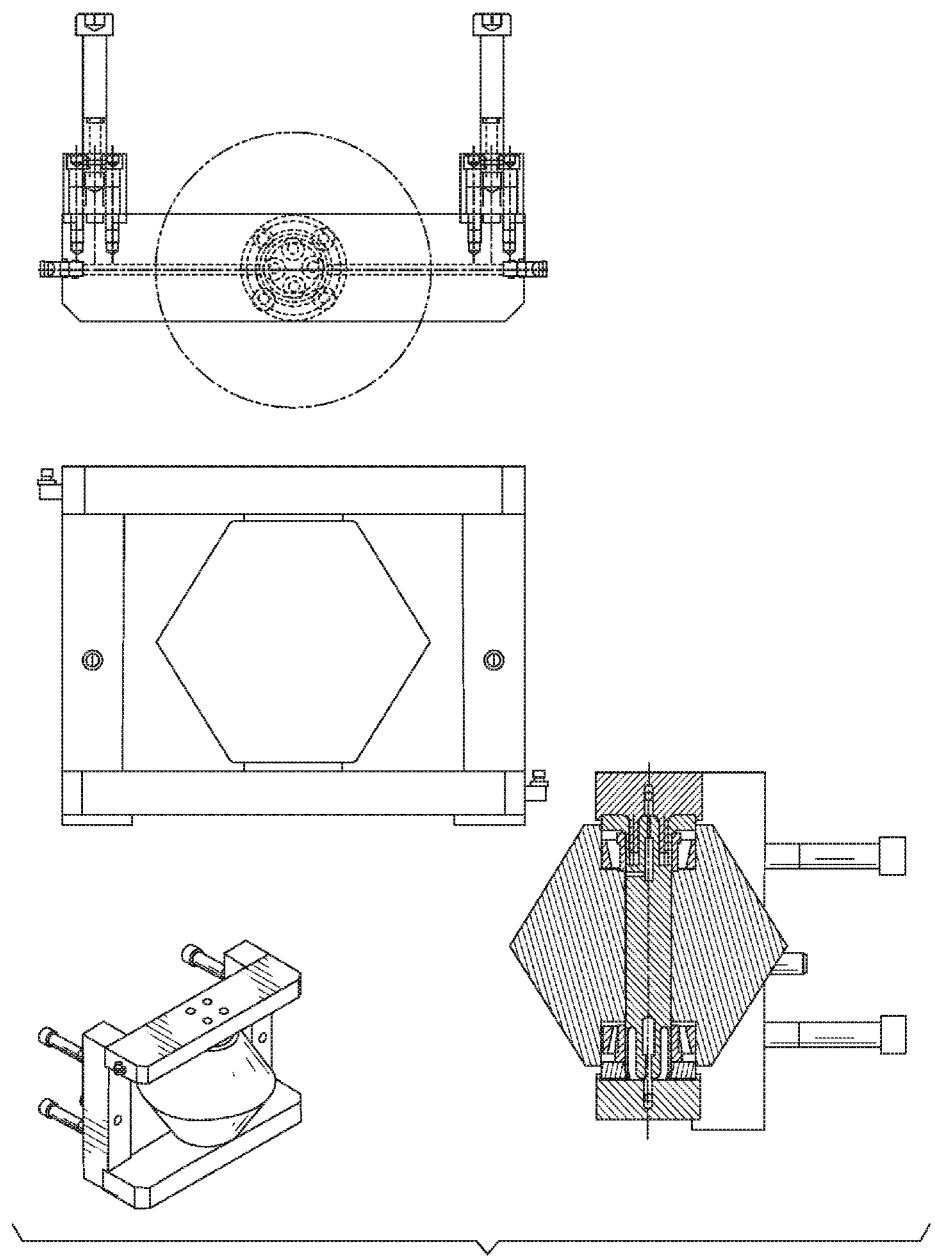
Figure 5:
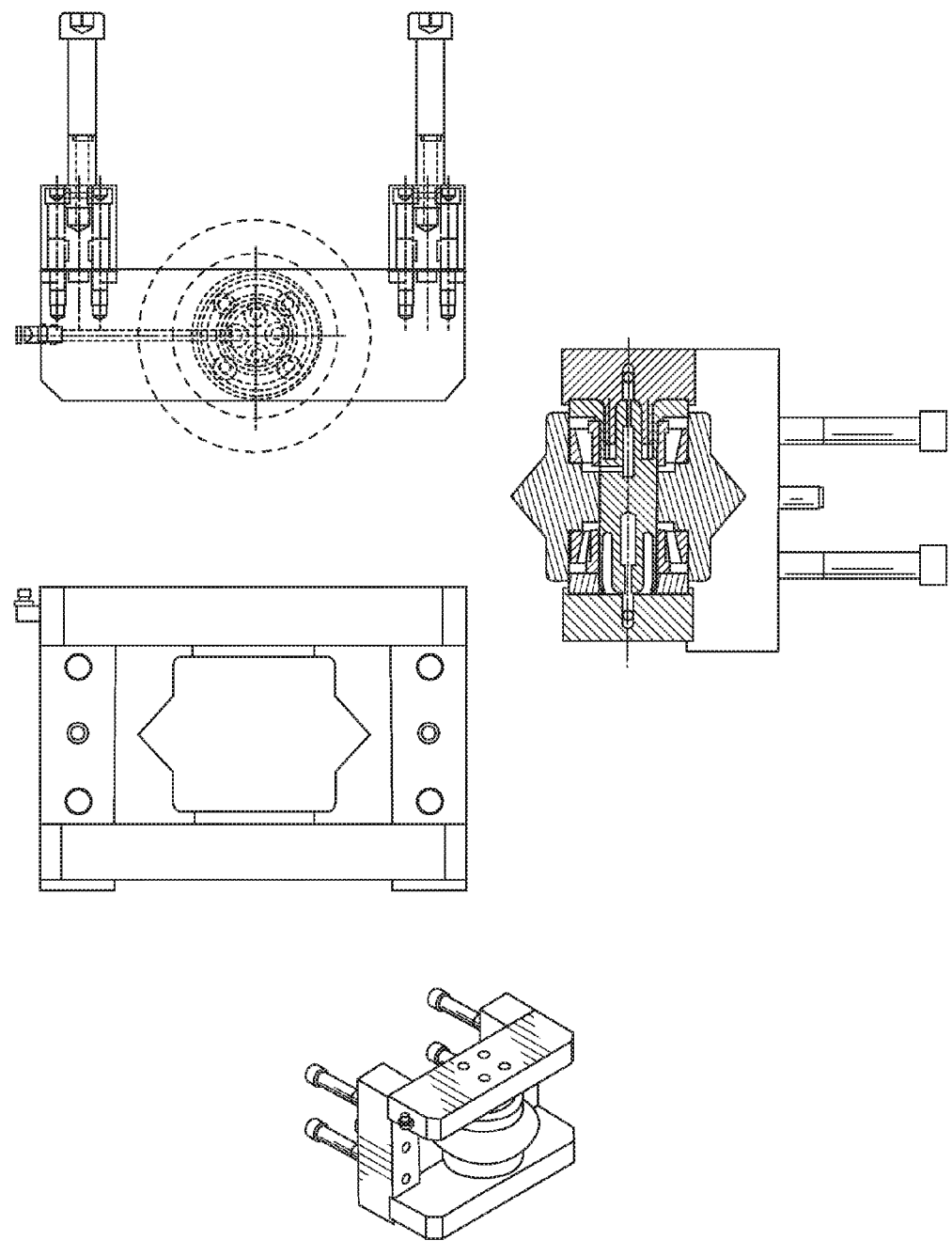
Figure 6:
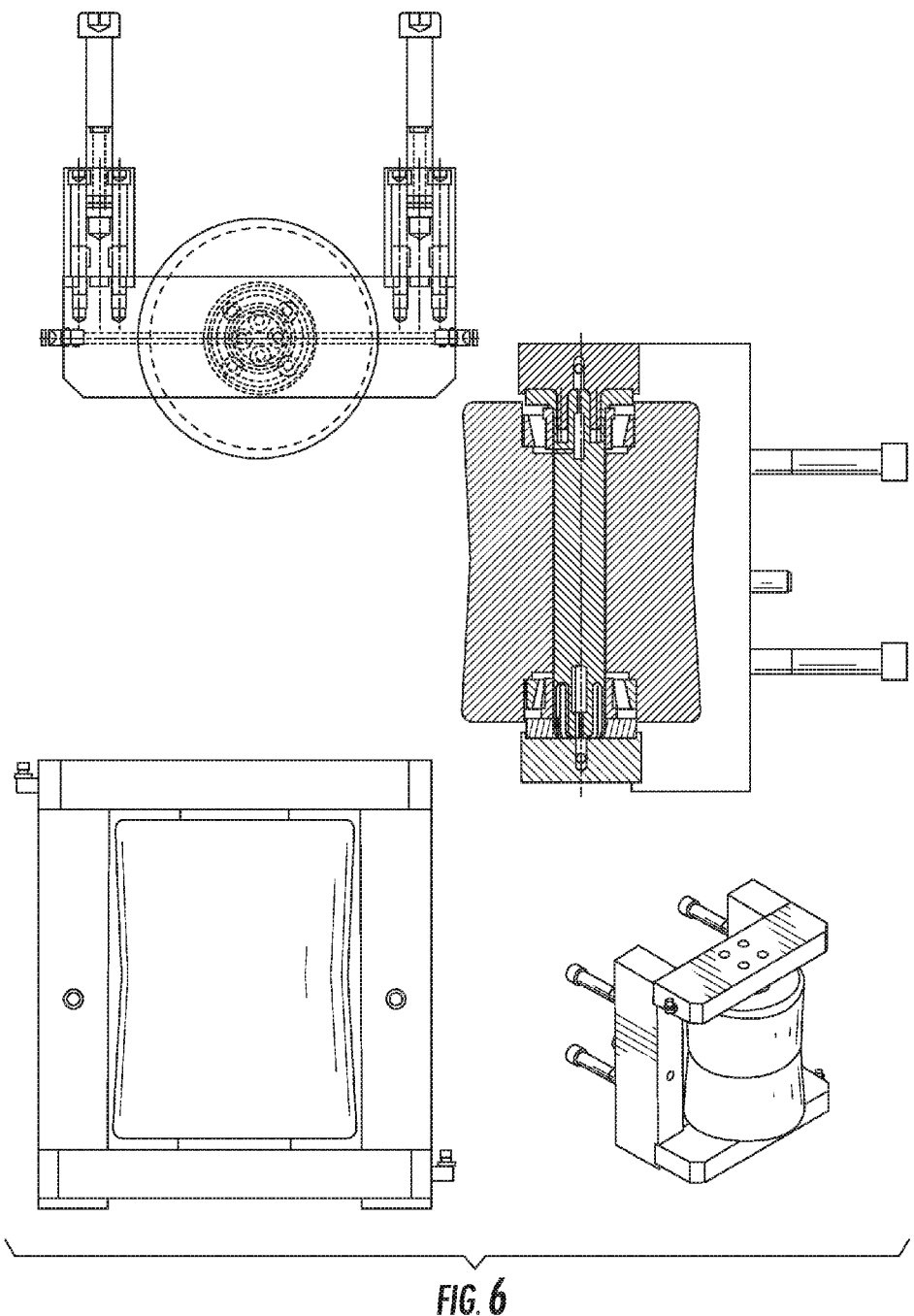

Referring specifically to FIG. 3, an initial double-surface forming-roller 30 is illustrated with double forming-surfaces including an upper forming-surface 32 and a lower forming-surface 34. In operation, as a strip of sheet metal enters initial channel-forming station 24, a pair of double-surface forming-rollers 30 will be in a position for surface 32 of each of the pair of double-surface forming-rollers 30 to engage the strip and start bending it upwardly into what will ultimately become an upwardly opening C-shaped channel. Additional movable double-surface forming-rollers in initial channel-forming station 24 are in the same position to continue bending the current strip of sheet metal into an initial or intermediate stage.

When the first strip is completed and continues down the line, double-surface forming-roller 30 and the other double-surface forming-rollers in initial channel-forming station 24 are simultaneously moved slightly by pneumatic apparatus 25 so that upper forming-surface 34 of double-surface forming-roller 30 engages the next strip and starts bending it downwardly into what will ultimately become a downwardly opening C-shaped channel. Additional double-surface forming-rollers in initial channel-forming station 24 will continue bending the current strip of sheet metal into an initial or intermediate stage. When the second strip of sheet metal is completed and continues down the line, double-surface forming-roller 30 and the other double-surface forming-rollers in initial channel-forming station 24 are moved back into the first position and the next strip is started bending upwardly again. It should be noted that the amount of movement required to change the double-surface forming-rollers from the first position to the second position is small, in some instances only fractions of an inch, but generally under an inch. Also, while a specific direction has been attributed to a specific forming-surface of the double-surface forming-rollers, it will be understood that depending upon the specific bend being performed, the specific forming-surface may change, i.e., either the upper or lower forming-surface may bend the strip of sheet metal upwardly or downwardly.

Figure 7:
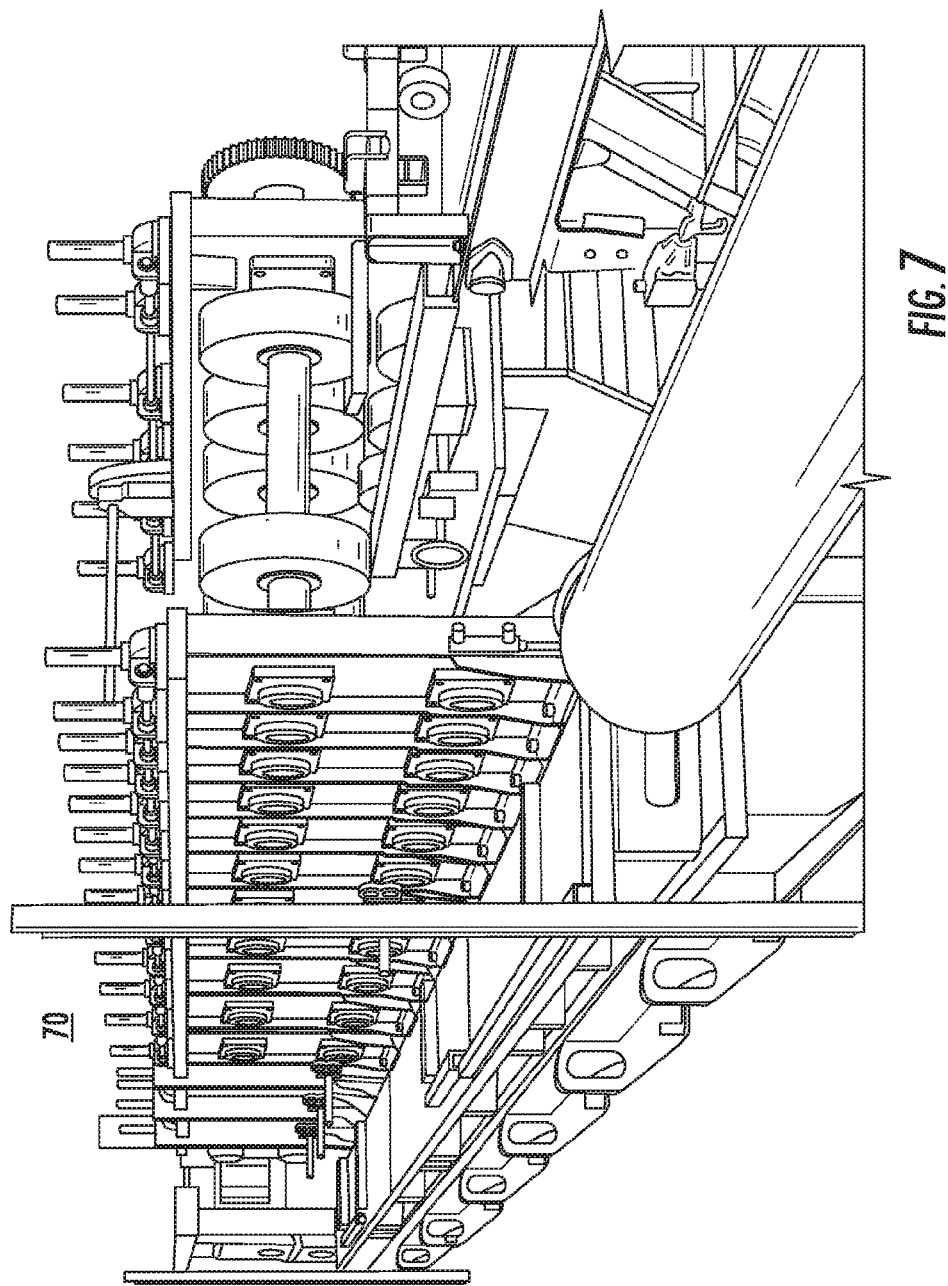
FIG. 7 is an isometric side view of a final channel-forming station of the column/beam manufacturing apparatus.
Figure 8:
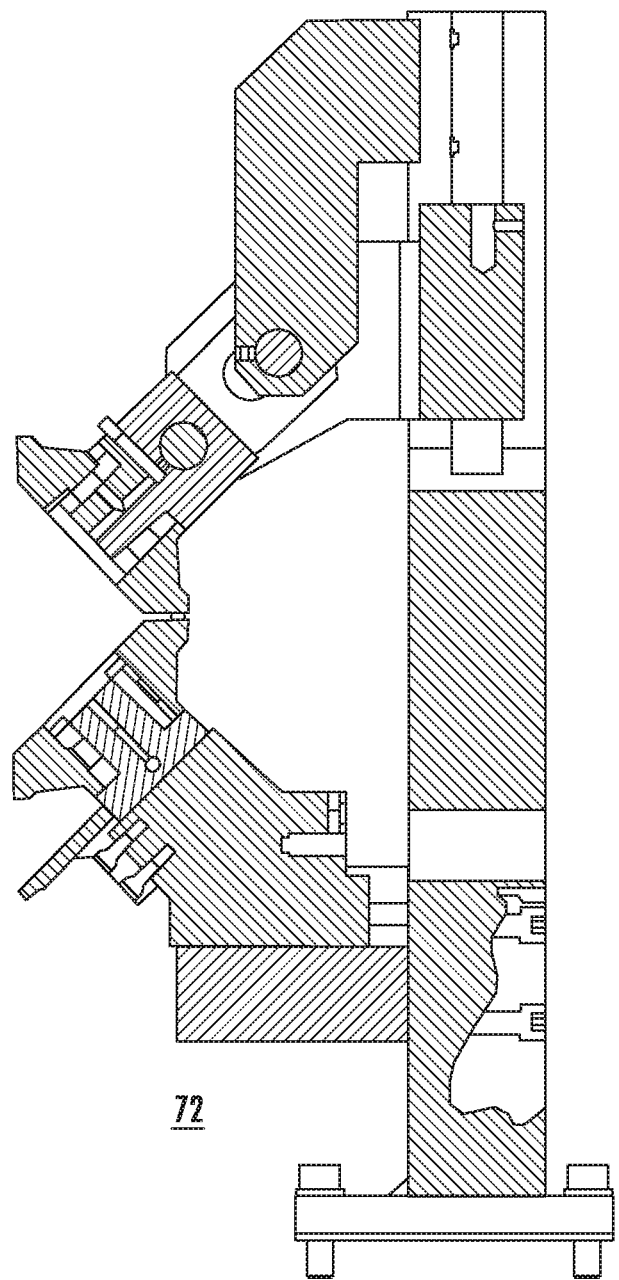
FIG. 8 is a sectional view of a channel-forming element pair used in the final channel forming station of FIG. 7.
Figure 9:
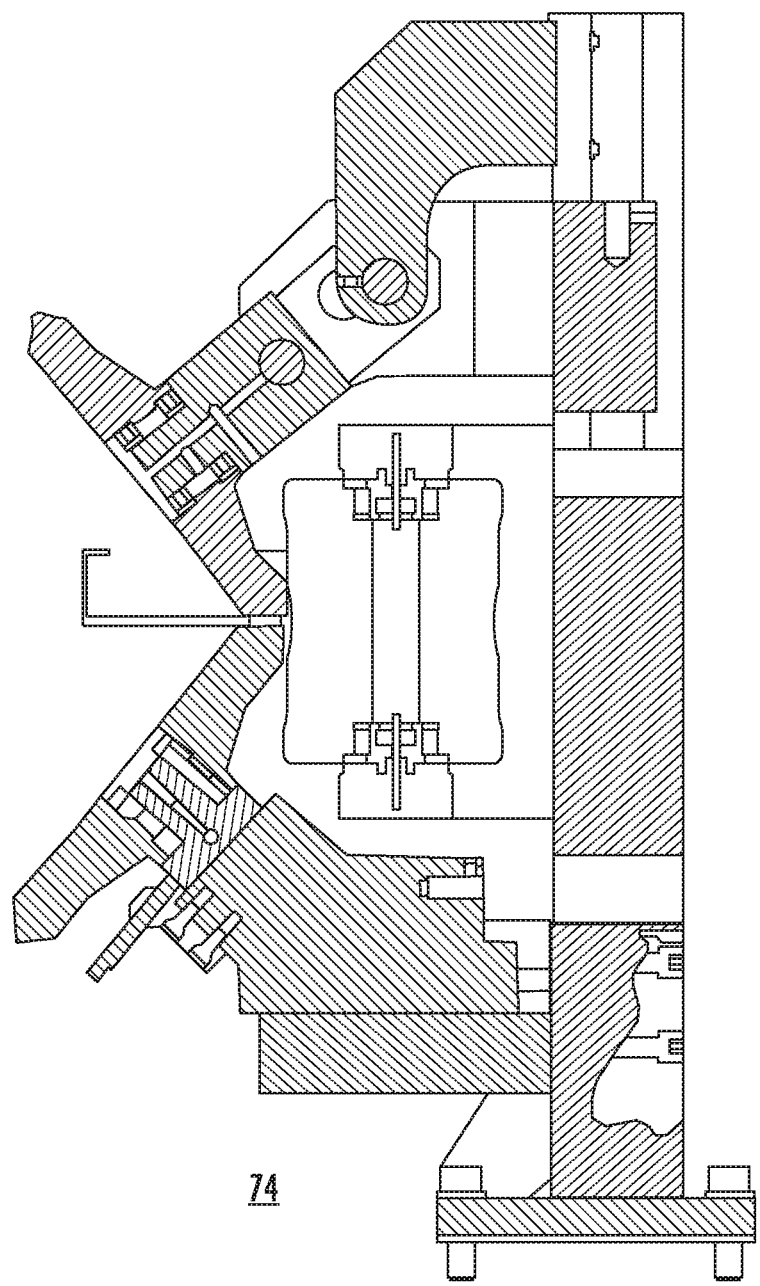
FIG. 9 is a sectional view of another channel-forming element pair used in the final channel-forming station of FIG. 7, illustrating a channel engaged therein.
Figure 10:
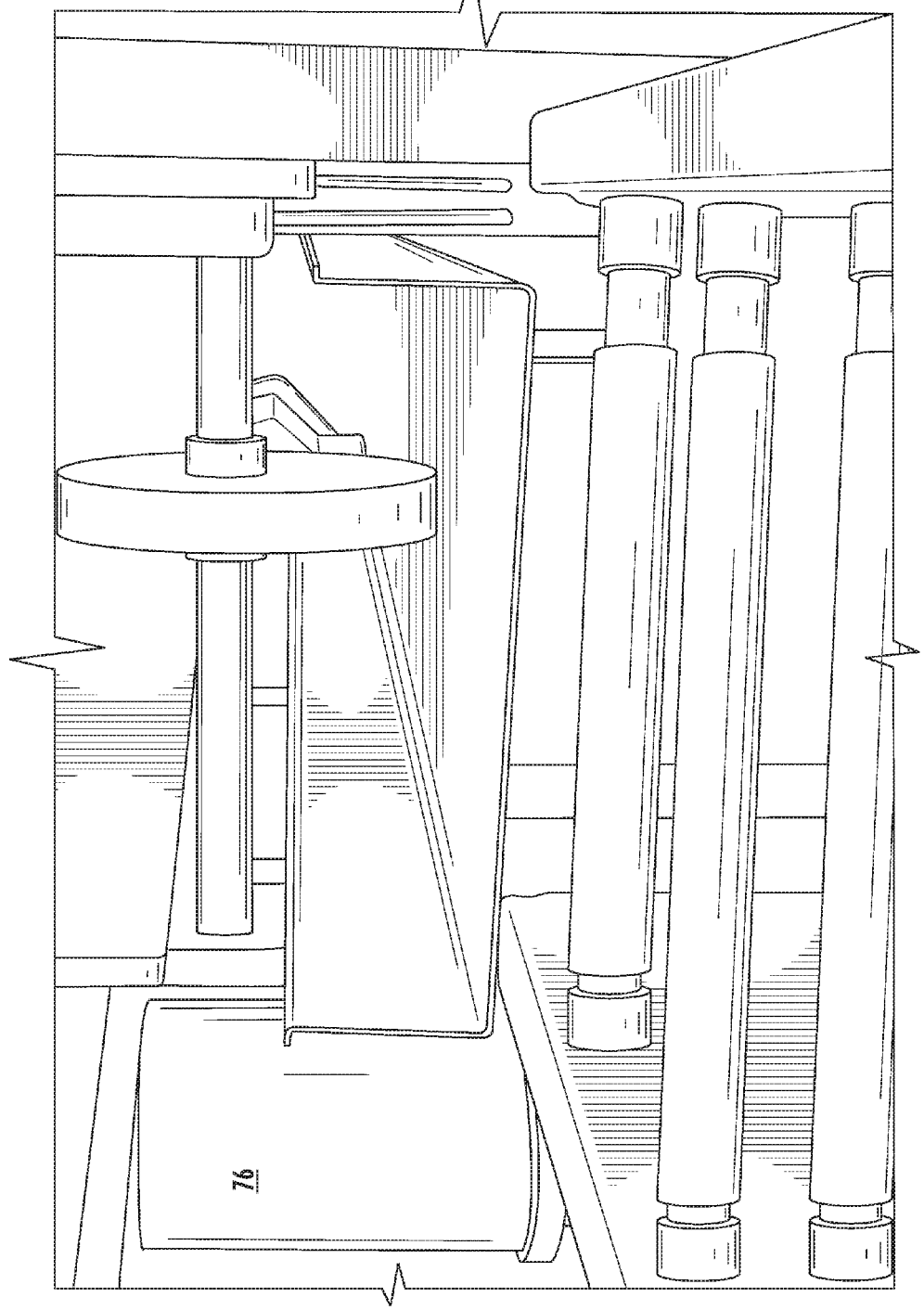
FIG. 10 is an isometric side view of a first channel exiting from the final channel-forming station of FIG. 7.

Turning now to FIG. 7, a final channel-forming station 70 is illustrated. Final channel-forming station 70 includes a plurality of forming-roller pairs that receive the partially or intermediate formed strips of sheet metal from initial channel-forming station 24 and completes the forming process to provide alternate upwardly opening and downwardly opening C-shaped channels. A typical channel-forming roller pair 72 is illustrated in FIG. 8. A second typical channel-forming roller pair 74 is illustrated in FIG. 9, including an illustration of an upwardly opening channel 76 positioned in channel-forming roller pair 74. It can be seen in FIG. 9 that channel-forming roller pair 74 will perform the same bending operation of a downwardly opening channel. Here it should be noted that forming-roller pairs are used and positioned so that either upwardly opening or downwardly opening channels can be equally processed. That is a strip of sheet metal formed into an initial or intermediate upwardly opening stage will be received and formed into a completely formed upwardly opening C-shaped channel 76 and a strip of sheet metal formed into an initial or intermediate downwardly opening stage will be received and formed into a completely formed downwardly opening C-shaped channel 78. A completely formed upwardly opening C-shaped channel 76 is illustrated in FIG. 10 exiting final channel-forming station 70.

Figure 11:
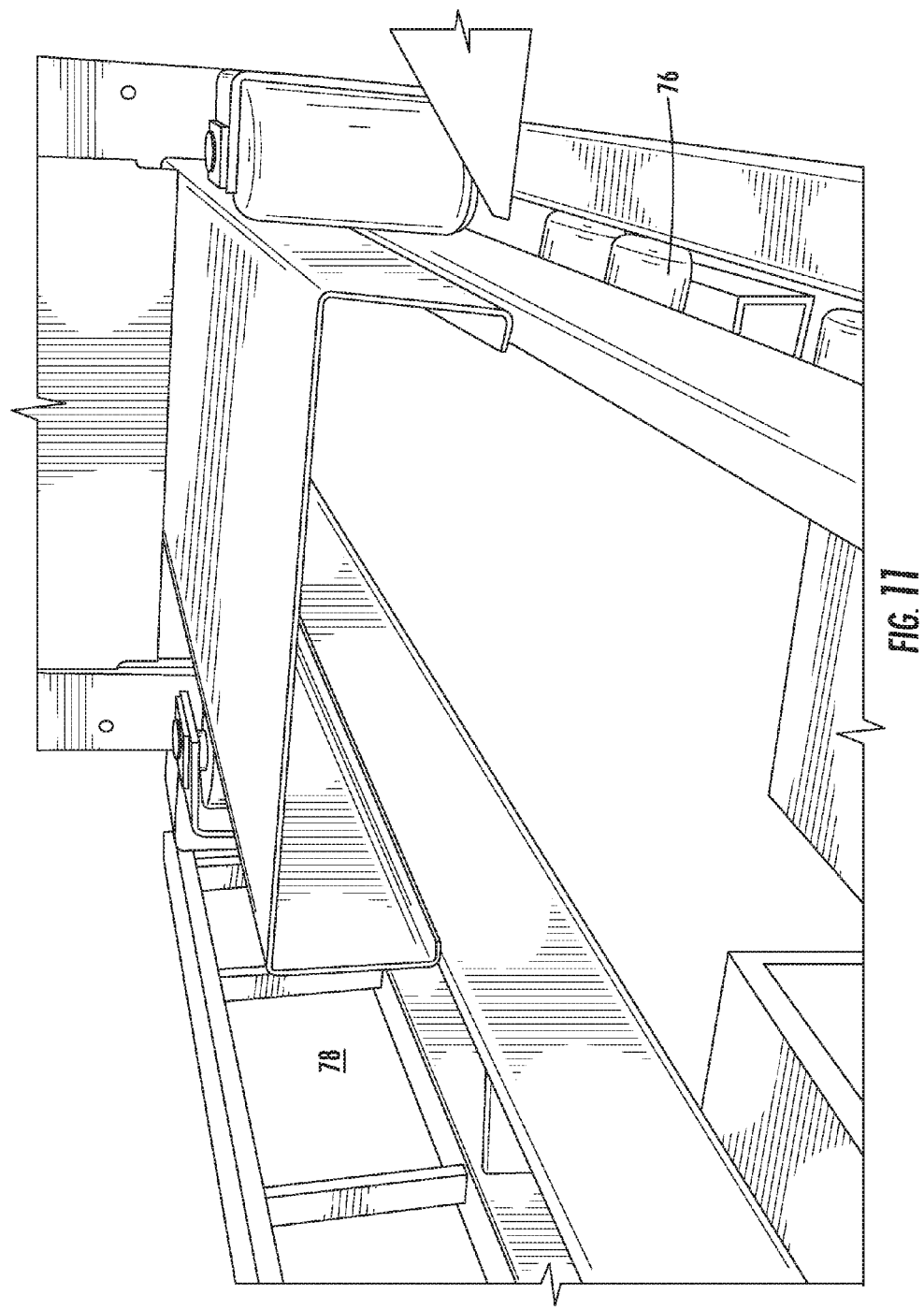
FIG. 11 is an isometric side view of a second channel exiting from the final channel-forming station of FIG. 7 in overlying relationship to the first channel illustrated in FIG. 10.

The next strip of sheet metal proceeding along the channel-forming apparatus is formed into a downwardly opening channel 78, illustrated in FIG. 11 exiting final channel-forming station 70. Here it should be noted that downwardly opening channel 78 is positioned in overlying relationship to upwardly opening channel 76 with the inwardly directed flanges at the ends of each leg in parallel abutting or adjacent positions. That is, the flanges of upwardly opening channel 76 are adjacent, parallel and abutting the flanges of downwardly opening channel 78 so that the legs on each side form a substantially continuous side-wall, i.e. lie in a common plane.

Figure 12:
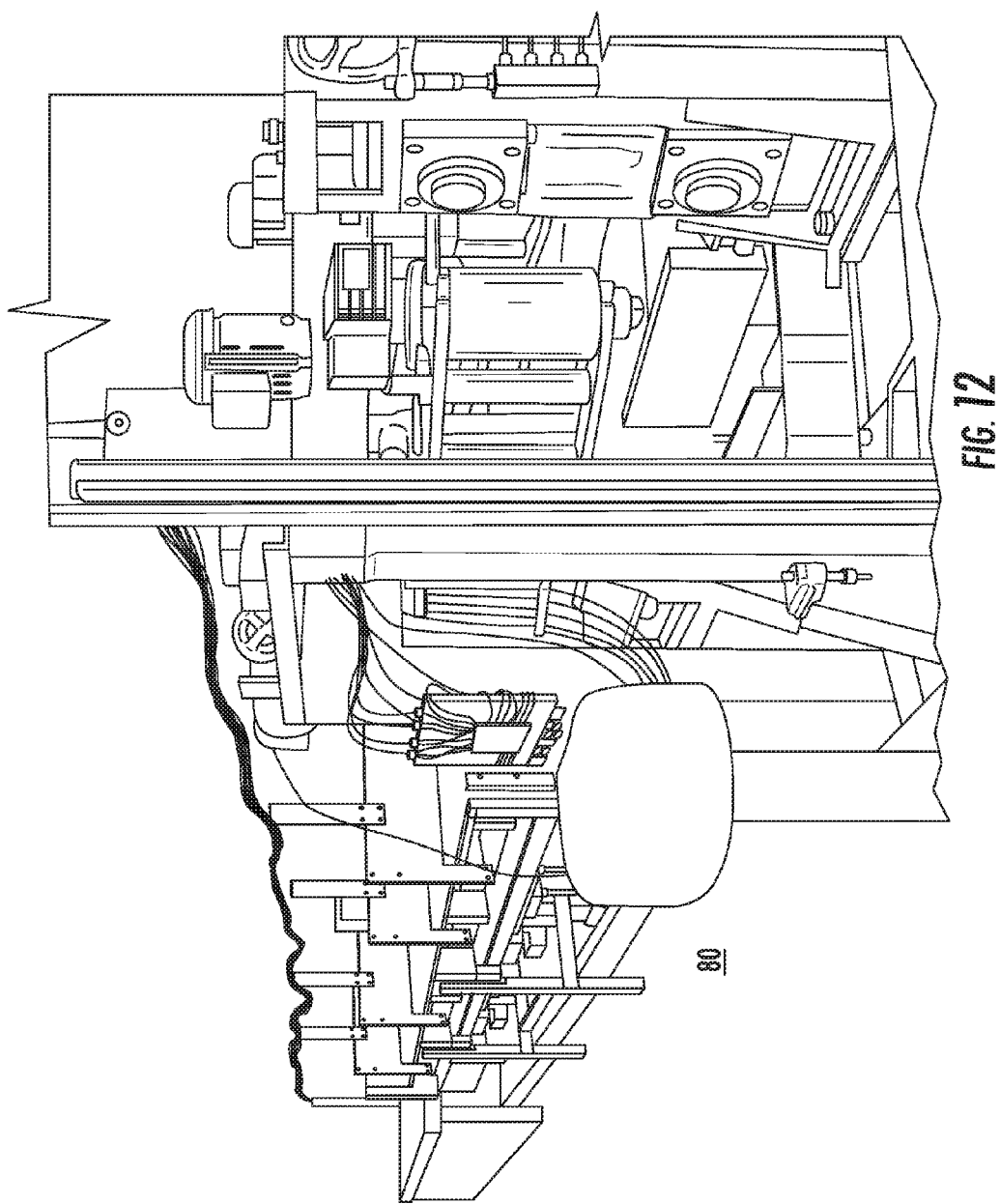
FIG. 12 is an isometric side view of a channel-aligning station positioned to receive the overlying first and second channels illustrated in FIG. 11.
Figure 13:
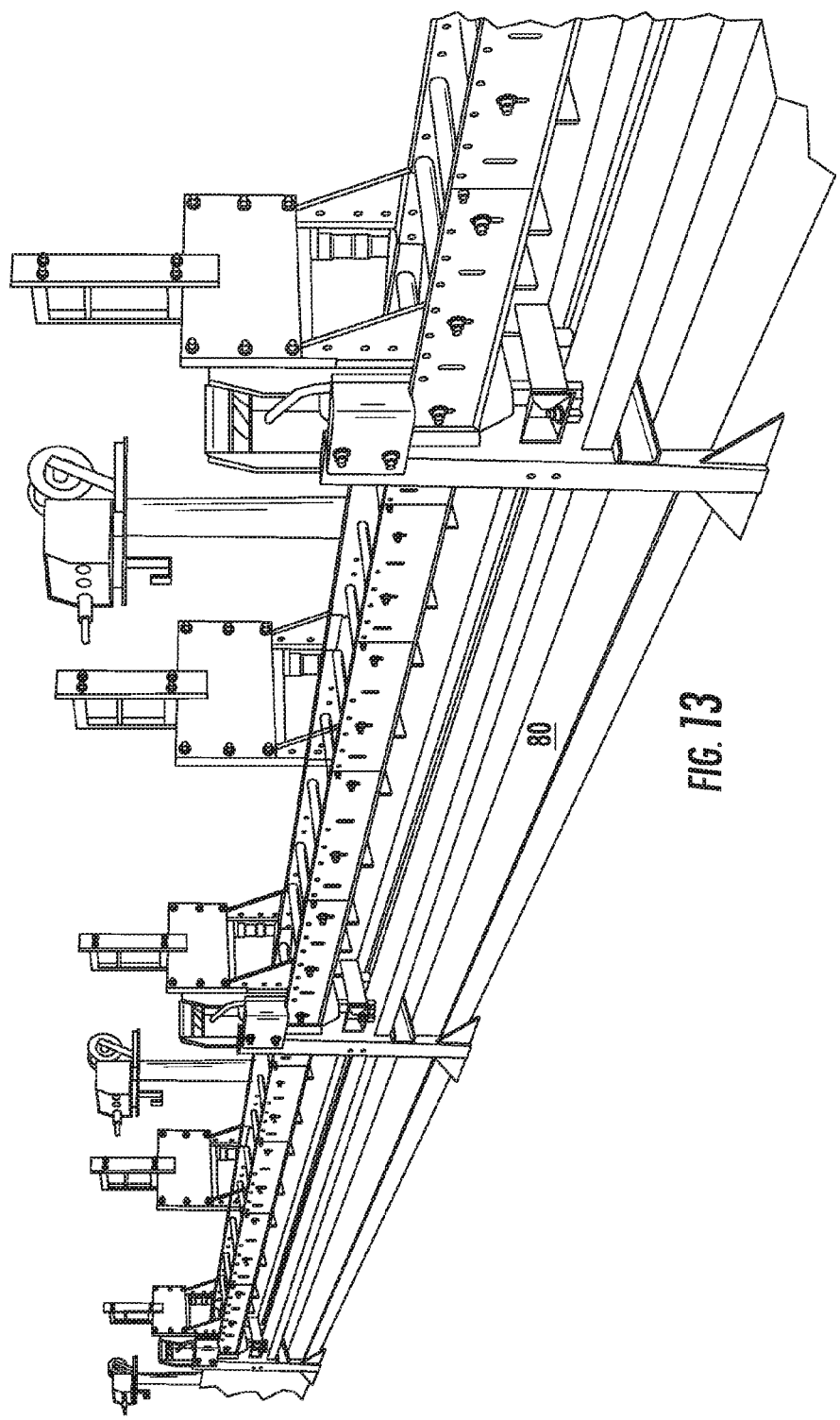
FIG. 13 is an enlarged isometric side view of the channel-aligning station illustrated in FIG. 12.

The overlying continuous pair of channels 76 and 78 move continuously along into a channel-aligning station 80, illustrated in FIG. 12 and enlarged FIG. 13. Channel-aligning station 80 holds the pair of overlying channels firmly in an overlying parallel aligned position (i.e. the legs aligned to form substantially continuous vertical side walls lying in a common plane and the ends terminating together in a common plane). The firmly held channels 76 and 78 are then welded on both sides at the interface between legs/flanges at a welding station 85, illustrated in FIG. 14. In this preferred embodiment channels 76 and 78 are welded at spaced apart areas designated 86 but it will be understood that any process from a continuous weld to areas spaced differently (e.g. farther or shorter) could be used.

Thus, columns and beams are manufactured from two opposed sheet metal C-shaped channels in a continuous process using a single channel-forming process. No labor or manual manipulation of the channels is required so that a substantial reduction in manual labor, time and cost is realized. The columns/beams are very strong while being lighter and less expensive than standard column/beam material, such as iron I-beams, steel box-beams, etc. Because no manual handling of channels (e.g. moving two channels into an overlying aligned position, holding, and welding) is included, columns/beams manufactured by the present novel apparatus are considerably faster to manufacture and much less expensive. Further, because a single intermediate bending apparatus and a single final bending apparatus is used the overall apparatus is simpler and cheaper to equip and use.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. Column/beam forming apparatus forming two C-shaped channels into an overlying relationship in a single column/beam, the apparatus comprising:
   a continuous source of sheet metal strips, each strip being of a desired column/beam length;
   an initial channel-forming station positioned to receive the strips of sheet metal from the continuous source and designed to provide initial longitudinal bending operations on each strip, the initial bending operations alternately bending received strips into an intermediate upwardly opening channel and an intermediate downwardly opening channel;
   wherein the initial channel-forming station includes a plurality of sets of double-surface forming-rollers, each of the double-surface forming-rollers having double forming-surfaces and all of the plurality of sets of double-surface forming-rollers being movable simultaneously between a first position in which one of the double forming-surfaces starts or forms a strip of sheet metal in an upwardly opening direction and a second position in which another of the double forming-surfaces starts or forms a strip of sheet metal in a downwardly opening direction, and each set of double-surface forming-rollers of the plurality of sets of double-surface forming-rollers positioned in a spaced relationship from a previous set of double-surface forming-rollers to gradually bend a strip of sheet metal into one of the intermediate upwardly opening channel and the intermediate downwardly opening channel;
   a final channel-forming station positioned to receive intermediate upwardly opening channels and intermediate downwardly opening channels from the initial channel-forming station and complete bending the intermediate upwardly opening channels and intermediate downwardly opening channels into upwardly opening C-shaped channels and downwardly opening C-shaped channels, respectively;
   each downwardly opening C-shaped channel being positioned in an aligned overlying relationship to a mating upwardly opening C-shaped channel upon exiting the final channel-forming station; and
   a channel-welding station positioned to weld the upwardly opening C-shaped channel and downwardly opening C-shaped channel in the aligned overlying position along an interface between adjacent surfaces of the upwardly opening C-shaped channel and downwardly opening C-shaped channel.

2. Column/beam forming apparatus as claimed in claim 1 wherein the continuous source of sheet metal strips includes a source of continuous sheet metal and a sheet metal cutting station, the sheet metal cutting station being positioned to receive the continuous sheet metal from the source and cut the continuous sheet metal into the strips of the desired column/beam length.

3. Column/beam forming apparatus as claimed in claim 1 further including a channel-aligning station positioned to receive the mating overlying upwardly opening C-shaped channel and downwardly opening C-shaped channel and firmly hold the upwardly opening C-shaped channel and downwardly opening C-shaped channel in an aligned overlying position.

4. Column/beam forming apparatus as claimed in claim 1 wherein the final channel-forming station includes a plurality of forming-roller pairs positioned in a spaced relationship from a previous set of forming-roller pairs to gradually bend a strip of sheet metal into one of an upwardly opening C-shaped channel and a downwardly opening C-shaped channel, the plurality of forming-roller pairs being positioned to receive intermediate upwardly opening channels and intermediate downwardly opening channels from the initial channel-forming station and complete the forming process to provide upwardly opening C-shaped channels and downwardly opening C-shaped channels, respectively, and the forming-roller pairs being designed and positioned so that either upwardly opening or downwardly opening channels are similarly processed.

5. Column/beam forming apparatus forming two C-shaped channels into an overlying relationship in a single column/beam, the apparatus comprising:
   a continuous source of sheet metal strips, each strip being of a desired column/beam length;
   an initial channel-forming station positioned to receive the strips of sheet metal from the continuous source, the initial channel-forming station including a plurality of sets of double-surface forming-rollers, each of the double-surface forming-rollers having double forming-surfaces and all of the double-surface forming-rollers being movable simultaneously between a first position in which one of the double forming-surfaces starts or forms a strip of sheet metal in an upwardly opening direction and a second position in which another of the double forming-surfaces starts or forms a strip of sheet metal in a downwardly opening direction, and each set of double-surface forming-rollers of the plurality of sets of double-surface forming-rollers being positioned in a spaced relationship from a previous set of double-surface forming-rollers to gradually bend a strip of sheet metal into one of an intermediate upwardly opening channel and an intermediate downwardly opening channel;

a final channel-forming station positioned to receive intermediate bent strips from the initial channel-forming station, the final channel-forming station including a plurality of forming-roller pairs positioned in a spaced relationship from a previous set to gradually bend a strip of sheet metal into one of an upwardly opening C-shaped channel and a downwardly opening C-shaped channel, the plurality of forming-roller pairs being positioned to receive intermediate upwardly opening channels and intermediate downwardly opening channels from the initial channel-forming station and complete the forming process to provide upwardly opening C-shaped channels and downwardly opening C-shaped channels, respectively, and the forming-roller pairs being designed and positioned so that either upwardly opening or downwardly opening channels are similarly processed;

each downwardly opening C-shaped channel being positioned in an aligned overlying relationship to a mating upwardly opening C-shaped channel upon exiting the final channel-forming station; and a channel-welding station positioned to weld the upwardly opening C-shaped channel and downwardly opening C-shaped channel in the aligned overlying position along an interface between adjacent surfaces of the upwardly opening C-shaped channel and downwardly opening C-shaped channel.

6. Column/beam forming apparatus as claimed in claim 5 wherein the continuous source of sheet metal strips includes a source of continuous sheet metal and a sheet metal cutting station, the sheet metal cutting station being positioned to receive the continuous sheet metal from the source and cut the continuous sheet metal into the strips of the desired column/beam length.

7. Column/beam forming apparatus as claimed in claim 5 further including a channel-aligning station positioned to receive the mating overlying upwardly opening C-shaped channel and downwardly opening C-shaped channel and firmly hold the upwardly opening C-shaped channel and downwardly opening C-shaped channel in an aligned overlying position.

8. A method of forming two C-shaped channels into a single column/beam, the method comprising the steps of:
providing a continuous source of sheet metal strips, each strip being of a desired column/beam length;
receiving strips of sheet metal of the desired column/beam length from the continuous source and, using a single intermediate bending apparatus, continuously forming alternate received strips into intermediate upwardly opening channels and intermediate downwardly opening channels, respectively;
the step of using the single intermediate bending apparatus includes a step of providing a bending apparatus including a plurality of sets of double-surface forming-rollers, each of the double-surface forming-rollers having double forming-surfaces and all of the double-surface forming-rollers being movable simultaneously between a first position in which one of the double forming-surfaces starts or forms a strip of sheet metal in an upwardly opening direction forming the intermediate upwardly opening channels and a second position in which another of the double forming-surfaces starts or forms a strip of sheet metal in a downwardly opening direction forming the intermediate downwardly opening channels;
receiving intermediate upwardly opening channels and intermediate downwardly opening channels and, using a single final bending apparatus, performing a complete or final bending operation, the complete bending operation continuously forming the intermediate upwardly opening channels into upwardly opening C-shaped channels and the intermediate downwardly opening channels into downwardly opening C-shaped channels;
positioning each downwardly opening C-shaped channel in an aligned overlying relationship to a mating upwardly opening C-shaped channel upon exiting from the single final bending apparatus; and
welding each upwardly opening C-shaped channel and downwardly opening C-shaped channel in the aligned overlying position along an interface between adjacent surfaces of the upwardly opening C-shaped channel and downwardly opening C-shaped channel.

9. A method as claimed in claim 8 wherein the step of providing the continuous source of sheet metal strips includes cutting a continuous strip of sheet metal into strip of a desired column/beam length.

10. A method as claimed in claim 8 wherein the step of positioning each downwardly opening C-shaped channel in the aligned overlying relationship includes positioning each downwardly opening C-shaped channel over an upwardly opening C-shaped channel with sides of the downwardly opening C-shaped channel positioned in a common plane with sides of the upwardly opening C-shaped channel and each end of the downwardly opening C-shaped channel positioned in a common plane with each similar end of the upwardly opening C-shaped channel.

11. A method as claimed in claim 8 wherein the step of using the single final bending apparatus includes a step of providing a bending apparatus including a plurality of forming-roller pairs positioned to receive intermediate upwardly opening channels and intermediate downwardly opening channels from the initial channel-forming station and complete the forming process to provide upwardly opening C-shaped channels and downwardly opening C-shaped channels, respectively, and the forming-roller pairs being designed and positioned so that either upwardly opening or downwardly opening channels are similarly processed.

12. A method of forming two C-shaped channels into a single column/beam, the method comprising the steps of:
providing a continuous source of sheet metal strips, each strip being of a desired column/beam length;
receiving strips of sheet metal of the desired column/beam length from the continuous source and, using a single intermediate bending apparatus including a plurality of sets of double-surface forming-rollers, each of the double-surface forming-rollers having double forming-surfaces and all of the double-surface forming-rollers being movable simultaneously between a first position in which one of the double forming-surfaces starts or forms a strip of sheet metal in an upwardly opening direction and a second position in which another of the double forming-surfaces starts or forms a strip of sheet metal in a downwardly opening direction, continuously forming alternate received strips into intermediate upwardly opening channels and intermediate downwardly opening channels, respectively;

receiving intermediate upwardly opening channels and intermediate downwardly opening channels and, using a single final bending apparatus including a plurality of forming-roller pairs positioned to receive intermediate upwardly opening channels and intermediate downwardly opening channels from the initial channel-forming station and complete the forming process to provide upwardly opening C-shaped channels and downwardly opening C-shaped channels, respectively, and the forming-roller pairs being designed and positioned so that either upwardly opening or downwardly opening channels are similarly processed, performing a complete or final bending operation continuously forming the intermediate upwardly opening channels into upwardly opening C-shaped channels and the intermediate downwardly opening channels into downwardly opening C-shaped channels;

positioning each downwardly opening C-shaped channel in an aligned overlying relationship to a mating upwardly opening C-shaped channel upon exiting from the single final bending apparatus; and welding each upwardly opening C-shaped channel and downwardly opening C-shaped channel in the aligned overlying position along an interface between adjacent surfaces of the upwardly opening C-shaped channel and downwardly opening C-shaped channel.

13. A method as claimed in claim 12 wherein the step of positioning each downwardly opening C-shaped channel in the aligned overlying relationship includes positioning each downwardly opening C-shaped channel over an upwardly opening C-shaped channel with sides of the downwardly opening C-shaped channel positioned in a common plane with sides of the upwardly opening C-shaped channel and each end of the downwardly opening C-shaped channel positioned in a common plane with each similar end of the upwardly opening C-shaped channel.

\* \* \* \* \*